INVENTOR.
ERIC G. PLATT, JOHN J. DUPUIS
BY [signature]
ATTORNEY

United States Patent Office 3,291,915

Patented Dec. 13, 1966

3,291,915

ELECTRONIC SWITCHING CONTROL CIRCUIT FOR TELECOMMUNICATION SYSTEM

Eric Gordon Platt, Worth, and John J. Dupuis, Chicago, Ill., assignors to International Telephone and Telegraph Corporation, a corporation of Maryland Filed Apr. 25, 1963, Ser. No. 275,693

17 Claims. (Cl. 179—18)

This invention relates to control circuits and more particularly to electronic switching control circuits.

A "switching network" is a device for selectively extending electrical paths for interconnecting one circuit with another circuit. The interconnected circuits may take many forms; however, we find it convenient to refer to them as subscriber lines, by way of example. The paths are generally extended via connection control circuits (usually called links, registers, or junctors) which first complete a separate path through the network to each line and then join the separate paths via a voice gate. One example of a network as described is found in a U.S. Patent 3,204,044 entitled "Electronic Switching Telephone System," granted August 31, 1965 to V. E. Porter, and assigned to the assignee of this invention.

The control circuit must perform many functions during the establishment of a switch path through the network. For example, if the network is part of a telephone system, the control circuit conducts a busy test, seizes a line or returns busy tone (as required), and then forwards ring current if the line is seized. In like manner many other functions could be required during a call such as: conversation timing, restricted service, and executive right-of-way. Yet another type of function is shown in a co-pending application entitled "Electronic Private Branch Exchange" by Seemann, Dupuis and Chen, Serial Nö. 230,588, filed October 15, 1962, and assigned to the assignee of this invention. This function involves the transfer of trunk calls from link circuits to trunk circuits.

Various schemes have been proposed for providing these and other functions. In small systems, the links or connection control circuits may include all equipment necessary for performing all required functions. This approach is economical when the function control circuits may be duplicated in every link at an expense which is less than the expense of a large common control device (such as a marker or register). The converse is also true. In large systems, the function control circuits may be placed in markers or registers and, therefore, economically shared by all calls. Here again we encounter the economic factor. The markers and registers can be used only when their cost is distributed over enough lines to justify the added expense of the common circuitry.

Accordingly, an object of the invention is to provide new and improved control systems especially—although not exclusively—for use in electronic switching telephone systems. Here an object is to provide for a sharing of function control circuits. In particular, an object is to meet the needs of a system which is too large for the inclusion of all function control circuits in every link circuit and too small for the use of highly complex common marker or register circuits.

Another object of the invention is to reduce the cost of electronic switching systems by making maximum use of existing designs. In particular, an object is to provide for a growth, in switching capacity, of the smaller system (function control circuits in the link) design without simultaneously obsoleting such smaller system design. Moreover, an object is to provide also for future growth into still larger register or marker controlled systems—again without obsoleting existing designs.

Yet another object of the invention is to provide ways and means of using function control circuits on the most economical basis regardless of whether the function control circuits are seized simultaneously as a pool, or individually as required. In this connection, an object is to accomplish these ends by adapting existing design techniques to new uses.

In accordance with one aspect of this invention, an auxiliary network is provided in addition to the principal network used to extend connections between subscriber lines. During discrete time frames, the link or connection control circuit has access to supplementary function control circuits via an auxiliary network. First, an initial path fires, during the discrete time frame, from a link requesting service through the auxiliary network to any idle function control circuit. Next, the idle circuit that is seized fires as many additional paths back through the auxiliary network to the requesting link as are required to perform the necessary functions. The initial and the return paths are fired through the auxiliary network during the same discrete time frame. The principles of the invention are such that the link may seize one or many function control circuits, either individually or simultaneously in register pools. This means that a small system may grow into a larger system by the simple expedient of adding more and more function control circuits until these circuits become, in effect, a common marker or register for the largest system.

The above mentioned and other features of this invention and the manner of obtaining them will become more apparent, and the invention itself will be best understood by reference to the following description of an embodiment of the invention taken in conjunction with the accompanying drawings, in which.

GENERAL DESCRIPTION

Figure 1:
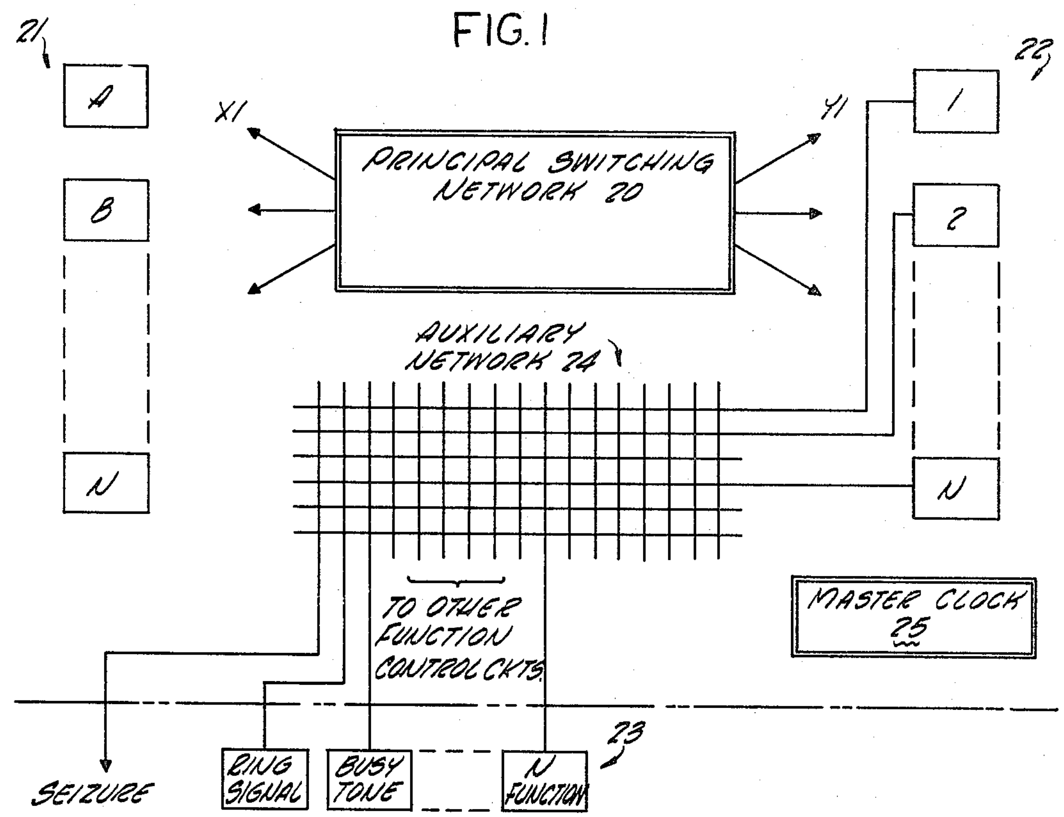
FIG. 1 is a block diagram showing a switching system incorporating the general principles of the invention.

FIG. 1 shows an exemplary electronic switching system comprising a principal switching network 20 having lines 21 connected to one side and links or connection control circuits 22 connected to the other side. The primary purpose of this switching system is to interconnect two lines, such as lines A and N, for example. These interconnections are extended under the control of an idle one of the link circuits 22. In greater detail, assume that line A requests service by marking a network access point X1 at a time when link "1" is idle and the marking point Y1. A path finds its own way through network 20 between these two end-marked points. Then link "1" exercises any controls functions necessary to extend a connection to line N. For example, one such control function is a busy test followed by the transmission of either a ring signal or a busy tone. There are, of course, many other functions which may also be required.

A plurality of functions control circuits are shown at 23; here the functions are designated seizure, ring signal, busy tone, and "N function" (a general term indicating any other desired operations). These function circuits are accessible to the link circuits 22 via an auxiliary switching network 24. Link access may be given one-at-a-time to any individual function control circuits or simultaneously to a pool of such circuits. To illustrate, for a one-at-a-time operation a busy test circuit may be seized first. After the busy test is completed that circuit is dropped. Then a ring signal circuit may be seized. After the called party answers that circuit is dropped. In like manner, any number of such seizures may occur one-at-a-time. In register pool operations, all of these circuits are seized simultaneously and released only after none of them are required.

Figure 2:
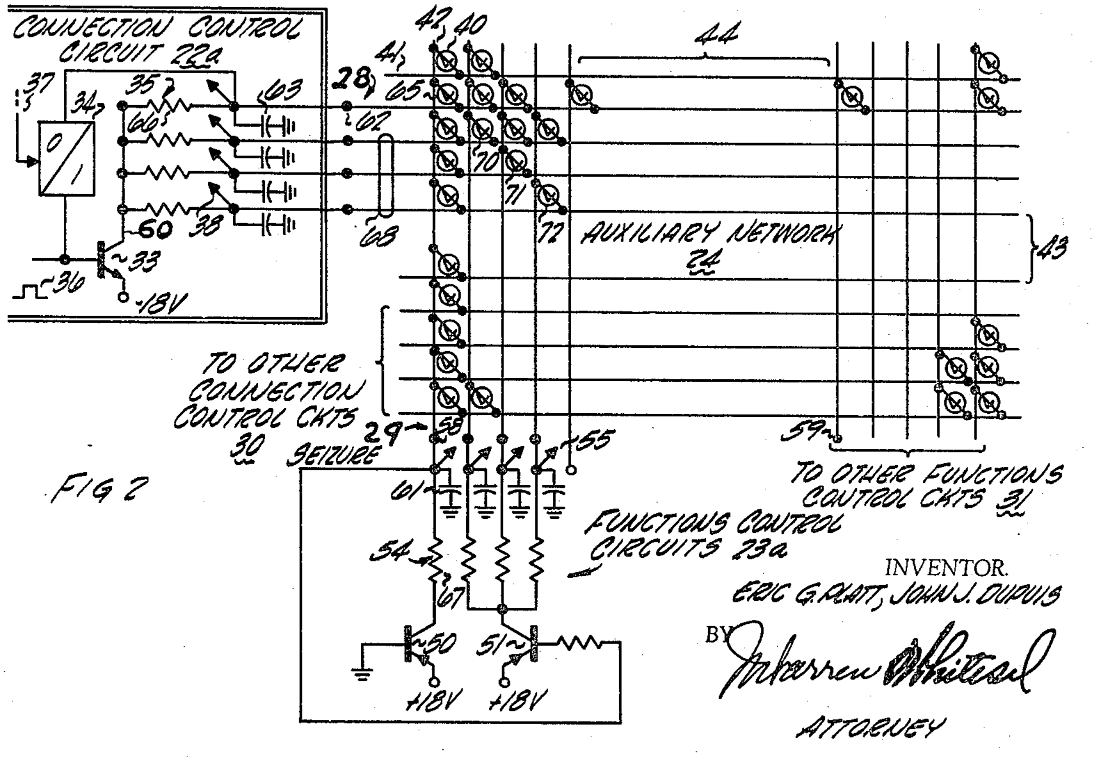
FIG. 2 is a schematic circuit diagram of the invention wherein paths fire through an auxiliary network to one or more function circuits during time frames associated with link circuits.
Figure 3:
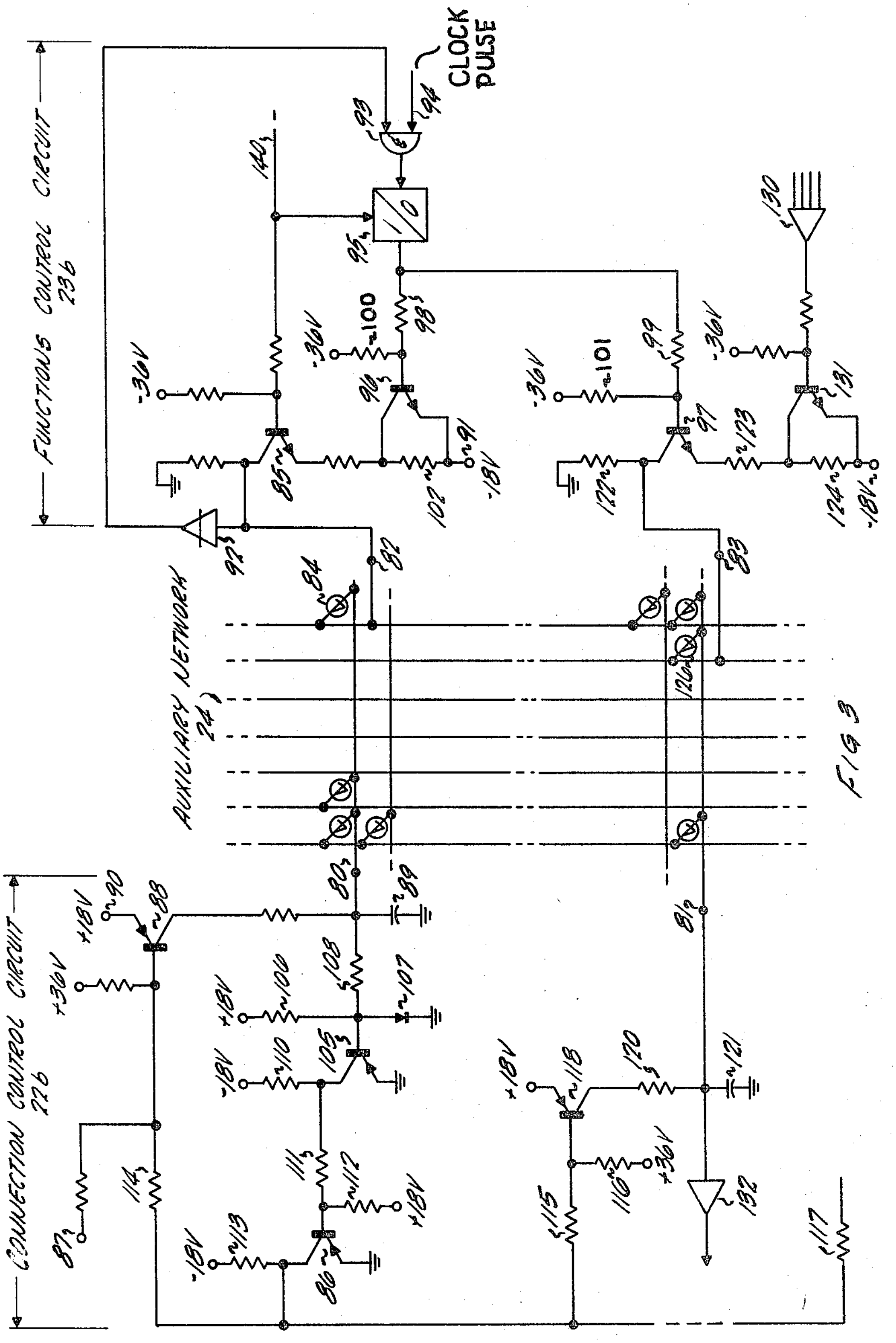
FIG. 3 is a schematic circuit diagram showing a second embodiment of the invention wherein paths fire through the auxiliary network to one or more of the function circuits during time frames associated with the function circuits.

To give access and extend connections through the auxiliary network 24, a master clock 25 generates discrete time frame pulses used to identify either the individual links 22 or the function control circuits 23, depending upon which of the embodiments of FIGS. 2, 3 is used. During a time frame, an initial path fires through the network 24 to any idle marked "seizure" point associated with the functions control circuits 23. Immediately thereafter the required functions control circuits fire one or more return paths back through the network 24 to requesting link circuit.

While the invention has many advantages which may occur to those skilled in the art, it may be helpful to here name a few. For example, the connection control circuits may seize individual function control circuits. Or, a group of function control circuits may be seized simultaneously as a register pool. Further a combination of individual and pool seizures may occur—depending upon what operation is most economical. Moreover, a minimum size system may be installed, and as the size of the system grows, adapter circuits may be added to increase capacity. Still other advantages will readily occur to those skilled in the art.

DETAILED DESCRIPTION

*FIGURE 2*

Next reference is made to FIG. 2 for a showing of the details of a first embodiment of the invention. The principal components circuits appearing in this figure are a connection control circuit 22*a*, a functions control circuit 23*a*, and the auxiliary network 24. Each of the circuits 22*a*, 23*a* is connected to an associated side of the auxiliary network 24 via a plurality of access points 28, 29. Moreover, it should be understood that the circuits 22*a*, 23*a* are duplicated as many times as required by system—as indicated by notations 30, 31.

The connection control circuit 22*a* contains any suitable equipment required to complete a call. For one example of such a circuit, see a co-pending application entitled "Electronic Switching Telephone System" filed May 29,1961, by Seemann and Haskins (Serial No. 113,178), and assigned to the assignee of this invention. The pertinent portions of the circuit which are shown here are an electronic switch 33, and a flip-flop circuit 34. Connected to the output of the switch 33, via a number of load resistors 35, are access points to the network 24. Also connected to the switch output is the flip-flop 34. The switch 33 is turned "on" when a connection control circuit identifying time frame or clock pulse 36 appears if the circuit 22*a* then requires a certain functions control circuit. As soon as switch 33 turns "on," flip-flop 34 is switched to its "1" side to hold switch 33 "on." This condition remains until the functions control circuits are no longer required. Then a pulse appears at a flip-flop reset point 37 to switch the flip-flop 34 back to its original state (side "1" if "off"); whereupon, switch 33 turns "off."

The arrows (such as 38) indicate tie points where components of circuit 22*a* connect in order to exchange signals with the functions control circuit 23*a*.

The auxiliary network 24 is a rectangular array of intersecting vertical and horizontal multiples. At every intersection, there is an electronic crosspoint adapted to switch "on" or "off" and thereby electrically join or isolate the intersecting multiples. For example, the crosspoint 40 is shown at the intersection of horizontal multiple 41 and vertical multiple 42. Only an exemplary few of these crosspoints appear in FIG. 2; however, it should be understood that all crosspoints have the same components. Here each crosspoint is shown by way of example as a PNPN diode. The brackets 43, 44 indicate that any suitable number of horizontal and vertical multiples may be provided.

The functions control circuit 23*a* includes two electronic switches 50, 51. Load resistors 54 connect the switches 50, 51 to energize any convenient number of associated vertical multiples. The arrows (such as 55) indicate tie points where the functions control circuits connect for signal and control purposes.

By way of review, the connection control circuit 22*a* has access to the auxiliary network 24 via points 28. The functions control circuit 23*a* has access also via points 29. Of course, any number of such access points may be provided, depending upon the number of function circuits required. As will become more apparent all idle functions control circuits 23*a* apply an end-marking potential to their associated seizure points 58, 59, etc. To request service, any connection control circuit 22*a* applies another end marking potential at point 60.

The FIG. 2 circuit operates this way. The ground potential on the base of transistor 50 holds it "on." A (+)18 volt potential on the emitter appears at the network access point 58 to charge capacitor 61, mark a "SEIZURE" bus, and energize the base of transistor 51. A (+)18 volt potential now appears at both the base and the emitter of transistor 51 which, therefore, can not turn "on." Hence the emitter voltage can not reach points 29.

If other functions control circuits are also idle they are marking points such as 59 with a (+)18 volt potential in the described manner.

Means are provided for causing a connection control circuit to seize any idle function control circuit during a clock controlled time interval. In greater detail, the pulse 36 appears during each time period which identifies circuit 22*a*. Any suitable logic, which remembers the need for a functions control circuit, allows the pulse to reach the base of transistor 33 when the function is required. Responsive thereto, the transistor 33 turns "on." The potential at point 62 rises, and the capacitor 63 charges. Each of the idle marked crosspoints connected to point 62 now has a firing pulse applied across its terminals.

Almost certainly one of the PNPN diodes marked with a firing pulse will fire before any other can fire. If two or more should fire at once, all except one will starve for want of a holding current and switch "off." At almost the instant when the first firing diode fires, the potential at point 62 drops with respect to the idle marking. Thus, no other diode in network 24 can fire because of the potential appearing at point 62. Assuming that diode 65 fires before any other diode can fire, circuit 23*a* is selected over the other idle functions control circuits. The current flow through the fired diode 65 causes the resistors 66, 67 to form a voltage divider and the potential at point 58 goes to a busy marking such as 0 volts, for example.

In review, it should now be apparent that any one of the connection control circuits may request a functions control circuit. When a clock pulse enables the requesting connection control circuit, a path fires through the auxiliary network to any idle one of the functions circuits depending upon the characteristics of the network diodes. Thus, the random distribution of diode characteristics causes an idle functions control circuit to be seized at random.

Means are provided for selectively returning a plurality of paths from the randomly seized functions control circuit through the auxiliary network to the requesting connection control circuit. In greater detail, when switch 33 turns "on" not only point 62—but also points 68—are marked. However, no diode marked via points 68 can fire because the associated vertical busses are not then marked, i.e. transistor 51 is "off." As soon as the diode 65 fires and the point 58 becomes less positive, the base of transistor 51 goes toward ground and the emitter of transistor 51 goes positive relative to the base. Thus, the transistor 51 switches "on" and (+)18 volts appears on each of the associated network access points 29.

No other random path can fire through the auxiliary network 24 at this time. For one thing, the clock controlled pulse 36 enables one and only one connection control circuit at any given time. Also, it should be noted that no transistors, corresponding to transistor 51, in other functions control circuits can turn "on" after the potential at point 62 has dropped. Hence, the network access points 29—and no other corresponding points—are marked on the function control circuit side of network 24 at this time. Thus, it follows that diodes 70–72—and only diodes 70–72—can fire. It should now be clear that, responsive to a random selection of any idle functions control circuit, a plurality of paths fire back through the auxiliary network to the specific connection control circuit that requested service, and further that all competing connection control circuits are inhibited from extending random paths while the selected paths are being extended.

Moreover, both the random and selected diode firings occur during the same time frame marked by pulse 36. Immediately after the diodes 70–72 fire the potentials at points 28 changes to eliminate the possibility that other diodes might fire.

After pulse 36 ends, the next time frame pulse enables some other connection control circuit to fire through the auxiliary network 24 if there is then a need for a functions control circuit. For example, a circuit connected to horizontal multiples 30 could fire to a circuit connected to the vertical multiples 31. From this it is apparent that the functions control circuit is seized on a random basis, but a multitude of control paths are completed back through the network on a selection basis.

When the functions control circuit 23*a* is no longer required, conductor 37 is pulsed, flip-flop 34 switches states, and the base of transistor 33 is no longer at an "on" potential. Transistor 33 switches "off." All diodes connected to the collector of transistor 33 starve and switch "off."

*FIGURE 3*

A second embodiment of the invention is shown in FIG. 3. Here a connection control circuit 22*b* is shown on the left, a functions control circuit 23*b* on the right, and the auxiliary switching network 24 in the middle. Each of the circuits 22*b*, 23*b* are representative ones of a plurality of similar circuits. The circuits of FIGS. 2 and 3 differ from each other primarily in that the time frame clock pulse identifies the connection control circuit 22*a* in FIG. 2 and the pulse identifies the functions control circuit 23*b* in FIG. 3.

In FIG. 3, the connection control circuit 22*b* is given access to the network 24 via two points 80, 81—of course, there could be more such points. The functions control circuit 23*b* has access to the network also via two points 82, 83—again any number of such points may be provided. As will become more apparent all idle functions control circuits 23*b* apply an end-marking potential at point 82. To request service, any connection control circuit 22*b* applies another end-marking potential at point 80. Then a path finds its way through any randomly fired diode (such as diode 84) to interconnect the requesting circuit and an idle functions control circuit during a particular time frame. Immediately thereafter and during the same time frame, the functions control circuit 23*b* marks point 83 while circuit 22*b* marks point 81 so that additional paths selectively fire between the two interconnected circuits.

Before any circuit operations, transistors 85, 86 are "on" and saturated. All other transistors are "off."

The circuit operates this way. Assume that the functions control circuit 23*b* is idle. Transistor 85 is "on" and (−) 18 volts appear at network access point 82. To request service, any suitable equipment (not shown) applies a negative potential to point 87. Then, the base of transistor 88 goes negative relative to its emitter, and it switches "on." The battery 90, (+) 18 volts on the emitter of transistor 88, charges capacitor 89 and raises the potential at end-marking point 80 on the lefthand side of the network 24. The sum of the two end-markings appearing at points 80, 82 equals a firing potential for the network diodes. Thus, since all idle functions control circuits 23*b* are applying a negative potential at access points on the righthand side of the network, a diode (such as 84) fires to interconnect the two circuits. In the unlikely event that two or more diodes fire simultaneously, all except one will starve for lack of current.

As soon as a diode (such as 84) fires, current flows between batteries 90, 91 to cause various IR drops and the voltages at points 80, 82 fall away from firing potentials. A NOT circuit 92 switches "on" when its input is not energized by the firing potential at point 82. The output of NOT circuit 92 feeds back to energize the upper input of AND circuit 93. Nothing further happens at this time.

Means are provided for causing the interconnected connection and functions control circuits to complete one or more selected paths through the network 24. In greater detail, a time base generator (not shown in FIG. 3) applies a particular time frame pulse to input 94 and AND gate 93 conducts. This causes a flip-flop 95 to switch from its "0" to its "1" sides to energize the base electrodes of transistors 96, 97 via resistors 98, 99. These resistors function as voltage dividers in conjunction with resistors 100, 101, respectively. Transistor 96 switches "on" and short circuits a resistor 102 so that the voltage at points 80, 82 change.

In the connection control circuit 22*b* connected to the functions control circuit 23*b*, a transistor 105 has a base bias circuit including a voltage divider comprising resistor 106, diode 107, and resistor 108. Normally the potential at the center of this voltage divider biases the base of transistor 105 to an "off" condition. However, the change in potential, which occurs when transistor 96 switches "on," is sufficiently negative to back bias diode 107. Thus, the potential on the base of transistor 105 goes negative relative to its emitter, and it switches "on."

The transistor 86 normally has its base biased "on" via a voltage divider including resistors 110–112 connected between (−) and (+) 18 volt batteries. When the transistor 105 switches "on," ground potential is applied to the junction of the resistors 110, 111 and the potential at the base of transistor 86 goes positive relative to the emitter. Thus, transistor 86 switches "off," and removes its emitter ground from its collector. Effectively, this amount to the application of a (−) 18 volt potential through resistors 113, 114 to the base of transistor 88. This potential holds the transistor 88 "on" after the requesting potential is removed from point 87.

To fire selective paths back through network 24, the negative potential applied through resistor 113 energizes a voltage divider including the resistors 115, 116. (The resistor 117 indicates that any number of similar voltage divider circuits may also be provided.) When the energized voltage divider circuit makes base of transistor 118 go negative, it switches "on." A (+) 18 volt battery potential is now applied through resistor 120 to charge a capacitor 121 and raise the potential at point 81 to an end-marking firing potential. Meanwhile, the transistor 97 has switched "on." Thus, the point 83 is energized by a negative potential taken from the voltage divider 122–124. Since the sum of the potentials at points 81, 83 now equals a firing potential, diode 126 fires. In like manner, any circuits connected via the resistor 117 also cause other diodes to fire for completing additional paths through the network 24.

To extend function controls from circuit **23*b* to circuit 22*b*, logic circuits, symbolically shown at 130, switch transistor 131 "on" and "off." Each time transistor 131 switches "on," the resistor 124 is short circuited to change the potential at point 81. The connection control circuit 22*b* performs any suitable operations under control of the changes of potential at point 81. Symbolically, the circuits for performing these operations are shown at 132**.

To release the paths through the network 24, conductor 140 is made negative, or point 87 is made positive. This resets the flip-flop 95 to its "0" side and switches "off" either or both transistors 85, 88. Responsive thereto, all transistors in circuit **23*b* switch "off." The network diodes starve and switch "off." After a moment, a ground potential reappears on conductor 140 and transistor 85** switches "on" to mark the functions control circuit "idle."

*FIGURE 4*

Figure 4:
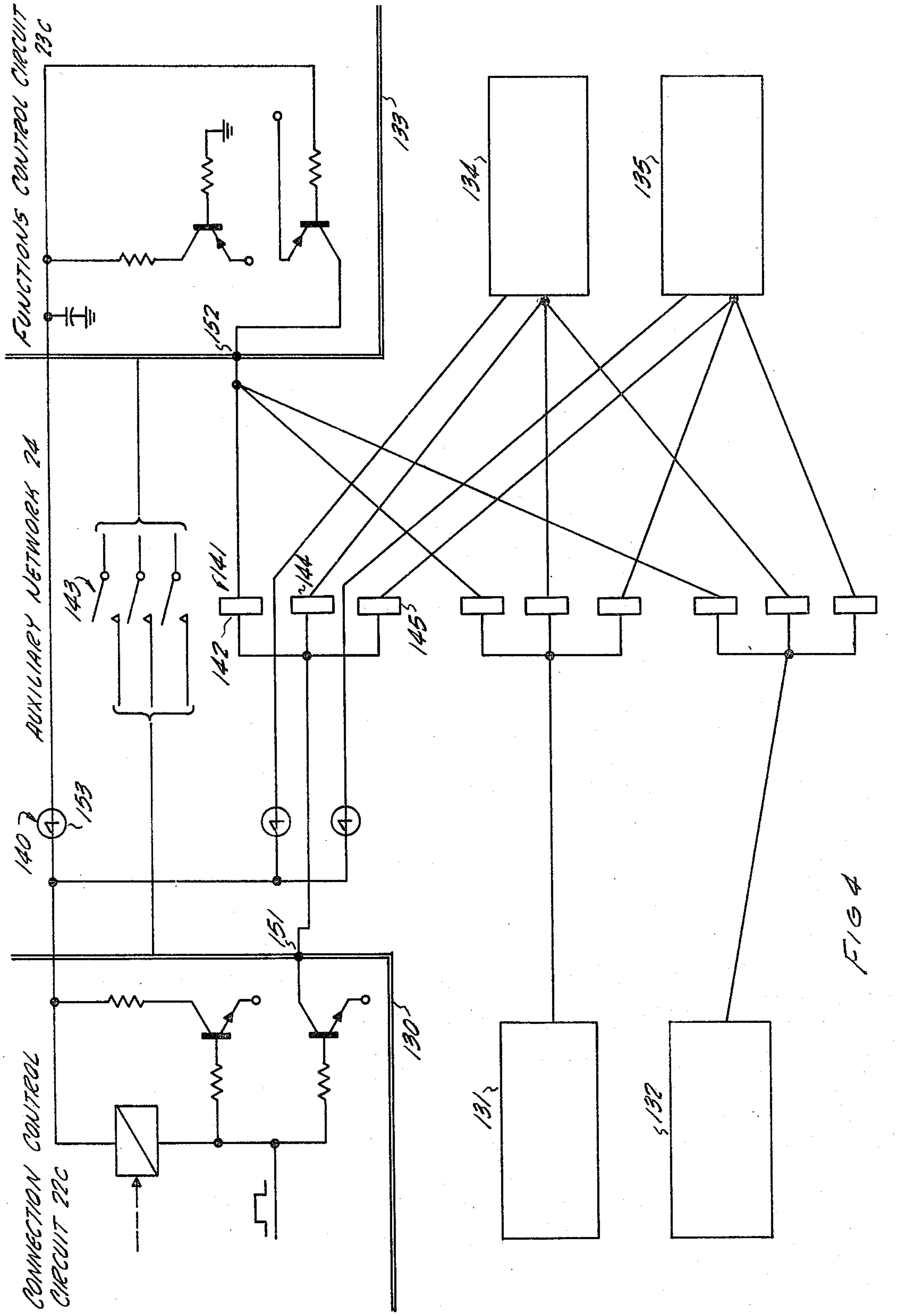
FIG. 4 is a schematic circuit diagram showing an alternative embodiment using relays to increase capacity.

A third embodiment is shown in FIG. 4. Occasionally, the paths between the connection and functions control circuits require either the completion of many paths or the transmission of voltages or currents which cannot economically be sent through the all electronic version of network 24. Thus, it may become desirable to provide for electronically controlled relay switching.

The components in FIG. 4 are arranged the same as those in the other figures are arranged. Here three connection control circuits 130, 131, 132 are shown on the left, three functions control circuits 133, 134, 135 on the right, and the auxiliary network 24 in the center. The network comprises a combination of electronic and electromechanical devices. Those crosspoints which are used to fire the randomly completed paths are PNPN diodes while the components used to complete the selected paths are relays. Thus, the diodes 140 are functionally the same as the diodes connected to point 62 in FIG. 2 or to point 80 in FIG. 3. The relay windings 141 are functionally the same as the diodes connected to points 68 in FIG. 2 or point 81 in FIG. 3.

Each relay controls a number of contacts in a network of contacts. For example, if winding 142 is energized, contacts 143 are closed. In like manner, every other winding closes similar contacts (not shown). Since winding 142 is unique to circuits **22*c*, 23*c* all of the contacts 143 are connected into paths extending between these two circuits. Likewise, all of the contacts controlled by the winding 144 complete connections between circuits 130, 134. Those contacts which are controlled by winding 145 complete connections between circuits 130 and 135.** By inspection of FIG. 4, the connections of the remaining contacts will be apparent.

As shown in FIG. 4, the random selection of an idle functions control circuit occurs when one of the diodes 140 fires. As before, the change in potential which occurs when current flows over a completed path causes end-markings to appear at points 151, 152 (assuming that circuits **22*c*, 23*c* are interconnected by a fired diode 153). One and only one of the relays 142 operates responsive to this marking. When it operates, relay 142 closes its contacts 143 to extend any number of paths between circuits 22*c* and 23*c***. In like manner, if any other relay operates, it will close similar contacts—which have not been shown.

While the principles of the invention have been described above in connection with specific apparatus and applications, it is to be understood that this description is made only by way of example and not as a limitation on the scope of the invention.

We claim:

1. A switching network comprising a plurality of network access points and a plurality of crosspoints, first circuits each of which is connected via a plurality of said access points to one side of said network, second circuits each of which is connected via a plurality of said access points to the other side of said network, means in each circuit connected to said one side of said network for normally applying a first marking to one of the plurality of points of access that is associated with the circuit applying the first marking, means in the second circuits for individually applying a second marking to one of the points of access associated with a second circuit requesting service, the sum of said first and second markings being equal to a potential required to close a crosspoint, whereby at least one crosspoint responds to said markings to interconnect an idle one of said first circuits and said requesting circuit, and means responsive to said crosspoint closure for causing the interconnected circuits to mark the remaining ones of the access points associated with each interconnected circuit for selectively extending additional paths between said interconnected circuits.

2. The network of claim 1 wherein said network comprises a plurality of intersecting multiples having a PNPN diode connected across each intersection, and means in said interconnected circuits for supplying only enough current to hold one of said diodes "on" whereby all except one path per marking through the network starves if simultaneous multiple firings should occur.

3. The network of claim 1 wherein each of said crosspoints comprises an electronic device, and means for limiting the energy applied to a completed path through said network to a level adequate to hold a single one of said electronic devices in an "on" condition, whereby all except one of said devices switches "off" if more than one device switches "on" responsive to said first and second markings.

4. The network of claim 1 and a plurality of relays, each of said relays having a winding and at least one contact controlled by said winding, each of said windings being uniquely connected between certain ones of said connection control and function control circuits, the contact controlled by each of said windings being uniquely connected between the same ones of said circuits to which the controlling winding is connected, and said means for marking the remaining access point comprises means for energizing a particular one of said windings to close selected points in said contact network.

5. An electronic switching system comprising a network of switching points, a plurality of connection control circuits connected to one side of said network, a plurality of function control circuits connected to the other side of said network, a clock controlled means for connecting any idle one of said function control circuits via at least one randomly selected switching point in said network to a requesting one of said connection control circuits during a particular time interval, and means thereafter effective during a given time interval for selectively extending at least one additional path between said one functions control circuit and said one connection control circuit.

6. The system of claim 5 and means wherein said particular and given time intervals are the same time interval.

7. The system of claim 5 and means wherein said additional paths are extended simultaneously to many of said function control circuits, thereby providing register pools for controlling said connection control circuits.

8. The system of claim 5 and means wherein said additional paths are extended one-at-a-time thereby providing the functions only as they are required.

9. The system of claim 5 wherein each of said switching points comprises a PNPN diode, and means for limiting the flow of current over said randomly selected point to the level of current required to hold a single PNPN diode, whereby if more than one diode fires, all except one will starve and switch "off."

10. The network of claim 5 and a plurality of relays, each of said relays having a winding with associated contacts arranged in a network extended between said connection control and function control circuits, said windings being connected between said connection and function control circuits in a unique manner such that energization of a network access point at any of said circuits applies a potential to one side of many windings, but only one winding is energized on both sides when said energization is applied from any two of said circuits, said means for selectively extending paths comprising means for marking access points from the circuits to be interconnected thus energizing a particular one of said relay windings, and means responsive to said energization of said one winding for closing contacts in said network which are connected between the circuits from which said windings are energized.

11. An electronic switching system comprising a switching network including a rectangular array of intersecting vertical and horizontal multiples having an electronic crosspoint at each intersection, a plurality of connection control circuits connected to one type of said multiples, a plurality of functions control circuits connected to the other type of said multiples, means for randomly connecting at least one of said function control circuits via said network to a connection control circuit requesting service, means for selectively extending at least one additional network path between the one of said functions control circuits that was randomly selected and said requesting connection control circuit, and means effective after said random connection for inhibiting the completion of other random connections until after said additional paths are completed.

12. An electronic switching system comprising a principal switching network, a plurality of lines connected to one side of said principal network, a plurality of connection control circuits connected to the other side of said principal network, means controlled by said connection control circuits for normally extending connections between any given ones of said lines via said principal network, a plurality of functions control circuits accessible to said connection control circuits, means comprising an auxiliary switching network for randomly connecting any available one of said functions control circuits to a requesting one of said connection control circuit when said function is required by said requesting circuit to serve the extension of said connection through said principal network, and means responsive to said random connection for selectively returning a plurality of additional paths from said one functions control circuit through said auxiliary network to said requesting circuit.

13. The system of claim 12 and means wherein said additional paths are extended simultaneously to many of said functions control circuits, thereby providing register pools for controlling said connection control circuits.

14. The system of claim 12 and means wherein said additional paths are extended one-at-a-time thereby providing the functions only as they are required.

15. The system of claim 12 wherein said auxiliary network comprises a plurality of PNPN diode crosspoints, and means for limiting current flow over completed paths through said auxiliary network to a level of current adequate to hold a single one of said diodes "on," whereby all diodes except one starve and switch "off" if more than one diode fires simultaneously in any given one of said paths.

16. The network of claim 12 and a plurality of relays, each of said relays having a winding and a plurality of contacts arranged in a network extended between said connection control and functions control circuits, said means for selectively returning said additional paths comprising means for operating particular ones of said relays to close selected contacts in said network.

17. An electronic switching telephone system comprising a principal switching network, a plurality of subscriber lines connected to one side of said principal network, a plurality of connection control circuits connected to the other side of said principal network, means responsive to signals from said connection control circuit for normally extending voice paths between any given ones of said lines via said principal network, a plurality of function control circuits accessible to said connection control circuit, means comprising an auxiliary switching network for randomly connecting any available one of said functions control circuits to a requesting one of said connection control circuits when the function of said available circuit is required by said requesting circuit to serve the extension of said connection through said principal network, said auxiliary network comprising a plurality of network access points and a plurality of crosspoints, each of said connection control circuits being connected via a plurality of said access points to one side of said auxiliary network, each of said function control circuits being connected via a plurality of said access points to the other side of said network, means in each of said functions control circuits for normally applying a first marking potential to one of the plurality of points of access that is associated with the circuit applying the first marking, means in each of said connection control circuits for individually applying a second marking potential to one of the points of access associated with a circuit requesting service, the sum of said first and second marking potentials being equal to a crosspoint control potential, means responsive to said crosspoint control potential for interconnecting a connection control and function control circuit, and means for marking the remaining ones of the access points associated with each of said interconnected circuits to extend additional auxiliary network paths between said interconnected circuits.

References Cited by the Examiner

UNITED STATES PATENTS

| | | | |
|---|---|---|---|
| 3,065,306 | 11/1962 | Burstow et al. | 179—18 |
| 3,184,552 | 5/1965 | Macrander | 179—18 |
| 3,188,423 | 6/1965 | Glenner et al. | 179—27.54 X |
| 3,223,978 | 12/1965 | Johnson | 179—18 X |

KATHLEEN H. CLAFFY, *Primary Examiner.*

L. A. WRIGHT, *Examiner.*